(12) United States Patent  (10) Patent No.: US 6,209,054 B1
Lee  (45) Date of Patent: Mar. 27, 2001

(54) RELIABLE INTERRUPT RECEPTION OVER BUFFERED BUS

(75) Inventor: Glenn E. Lee, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/212,880

(22) Filed: Dec. 15, 1998

(51) Int. Cl.⁷ .................................................. G06F 13/00
(52) U.S. Cl. .................. 710/129; 710/126; 710/260; 710/58; 710/52
(58) Field of Search ................ 710/48–61, 260–266, 710/107–131

(56) References Cited

U.S. PATENT DOCUMENTS

| | | | |
|---|---|---|---|
| 4,991,169 | 2/1991 | Davis et al. ......................... | 370/77 |
| 5,122,691 | 6/1992 | Balakrishnan ...................... | 307/475 |
| 5,594,727 | 1/1997 | Kolbenson et al. ................. | 370/442 |
| 5,659,542 | 8/1997 | Bell et al. ............................ | 370/496 |
| 5,732,079 | 3/1998 | Castrigno .......................... | 370/362 |
| 5,742,649 | 4/1998 | Muntz et al. ....................... | 375/371 |
| 5,796,732 | 8/1998 | Mazzola et al. ................... | 370/362 |
| 5,850,530 | * 12/1998 | Chen et al. ....................... | 710/113 |
| 5,857,083 | * 1/1999 | Venkat ............................... | 395/309 |
| 5,898,848 | 4/1999 | Gulick ............................... | 395/308 |
| 5,913,045 | 6/1999 | Gillespie et al. .................. | 395/309 |
| 5,920,572 | 7/1999 | Washington et al. .............. | 370/535 |
| 5,925,099 | 7/1999 | Futral et al. ...................... | 709/204 |
| 5,941,964 | 8/1999 | Young et al. ..................... | 710/100 |
| 5,958,032 | * 9/1999 | Manabe ............................ | 710/126 |
| 5,961,623 | * 10/1999 | James et al. .................... | 710/113 |
| 5,974,051 | 10/1999 | De Nicolo et al. ............... | 370/447 |
| 5,987,555 | * 11/1999 | Alzien et al. .................... | 710/129 |
| 6,021,483 | * 2/2000 | Adar et al. ....................... | 712/29 |
| 6,047,120 | * 4/2000 | Bell ................................... | 395/500.48 |
| 6,070,209 | * 5/2000 | Hausauer ......................... | 710/104 |
| 6,078,976 | * 6/2000 | Obayashi ......................... | 710/128 |
| 6,108,739 | * 8/2000 | James et al. .................... | 710/113 |
| 6,128,711 | * 10/2000 | Duncan et al. ................. | 711/155 |
| 6,138,192 | * 10/2000 | Hausauer ......................... | 710/100 |

* cited by examiner

*Primary Examiner*—Christopher B. Shin
(74) *Attorney, Agent, or Firm*—Thelen Reid & Priest LLP; David B. Ritchie

(57) ABSTRACT

A method and apparatus for reliable interrupt reception over a buffered bus utilizes a non-delayed non-posted write transaction to write data over the bus from a peripheral device to host memory. Because there is no buffering delay in a non-delayed non-posted write transaction, at the completion of the write cycle the peripheral knows that the write transaction is complete and then sends an interrupt request to the host processor requesting the host processor to service the interrupt and process the contents of the host memory.

18 Claims, 4 Drawing Sheets

RELIABLE INTERRUPT RECEPTION OVER BUFFERED BUS

STATEMENT OF RELATED APPLICATION

This application is related to U.S. patent application Ser. No. 09/212,016 filed on even date herewith in the name of the same inventor and commonly assigned herewith.

BACKGROUND OF THE INVENTION

1. Field of the Invention

The present invention relates generally to maintaining data coherency and consistency ("transaction ordering") in data transfer operations which occur asynchronously from their corresponding interrupt signals. More particularly, the present invention relates to reliable interrupt generation and reception over a buffered bus.

2. The Background

Asynchronous communication between computer system components, such as controlling the flow of data operations between peripheral devices ("peripherals"), and a host processor through a buffered bus using interrupt signals ("interrupts") to advise the host processor of a request for a particular operation, are known in the art.

Referring now to FIG. 1, peripherals such as network interface modules (port adapters) 10, 12 connect network media from networks 14, 16, respectively, to a first bus 18 which may be a PCI (peripheral component interchange) bus or a similar type of bus. Other peripherals such as a storage adapter 20, display adapter 22 and audio adapter 24, to name a few, may also be attached to first bus 18 as shown in FIG. 1.

A second bus 26, preferably using a fast bus architecture such as a local bus architecture couples one or more host processors 28 with one or more instances of host memory 30.

A bridge 32 with buffering capability is used to couple a first bus 18 (there may be one or more instances of first bus 18 and bridge 32) to second bus 26.

When a peripheral device has data requiring processing by host processor 28, two events occur asynchronously. In the first event, the peripheral performs a write transaction which includes sending the data to host memory 30 through first bus 18, buffering bridge 32 and second bus 26. The write transaction includes an address phase indicating a target location in host memory 30 and at least one data phase indicating the data to be stored in host memory 30, thus data is typically sent in a number of data blocks including data and header information indicating address information. In the second event, the peripheral uses an interrupt request to notify host processor 28, even when host processor is busy (such as when it is executing program code), that a data transaction needs to be processed. The interrupt reaches host processor 28 through first bus 18, bridge 32 and second bus 26. Host processor 28 then responds to the interrupt request by accessing the data from host memory 30 and sends an acknowledgement signal back to the originating peripheral over second bus 26, bridge 32 and first bus 18.

Using first bus 18 and bridge 32 to send data and interrupt requests to host processor 28 presents a number of disadvantages. First, a delay period ("latency") is incurred between the time that the interrupt request is sent to first bus 18 and the time that it is received by host processor 28. Second, this latency may be increased depending upon the number of peripherals arbitrating for the use of the first bus 18. Furthermore, such an approach inherently creates a race condition between data to be processed by host processor 28 and the interrupt requests corresponding to that data. Such a race condition can sometimes result in the interrupt being received and acted upon by host processor 28 before the corresponding data has been received in host memory 30. In such a situation, data may be lost.

Some solutions to the race condition problem exist. In accordance with one solution, the peripheral signaling the interrupt performs a read of the data written to host memory 30 to verify receipt in memory prior to sending the interrupt signal over the buffered bus to the host processor 28. This solution is easy to implement. Having the peripheral perform the read is much better than having the host processor perform the read from a processor throughput point of view. A major disadvantage is that the peripheral must execute a read cycle over the bus which could take a relatively long time due to bus arbitration and time required to traverse all bridges (there may be ore than one) in the path. Another problem with this solution is that it can have the side effect of providing the host processor 28 with a spurious interrupt. This can happen when (1) the peripheral device writes block 1 of data and block 2 of data into host memory 30; (2) the host memory 30 receives block 1 and block 2; (3) the peripheral device begins reading the host memory to verify receipt and reads block 1; (4) the peripheral device generates an interrupt for block 1 to the host processor 28; (5) the receipt of block 2 by the peripheral device is delayed due to latency; (6) the host processor 28 receives the first interrupt, acknowledges it and acts on it by processing all of the contents of host memory 30 including block 1 and block 2; (7) the read of block 2 by the peripheral device is completed and the peripheral device sends a second interrupt request to the host processor 28; and (8) the host processor 28 acknowledges and acts on the second interrupt only to find that it has already processed the contents of host memory 30.

In another solution the host processor 30, or a device associated with it, performs a read operation to a register of the peripheral device in response to receipt of the interrupt request before accessing the data written by the peripheral into host memory. This guarantees that all of the data to be written to the host memory will necessarily have cleared the buffers before this step can be completed. This approach can increase latency because the read operation can be further delayed due to bus arbitration issues under loaded conditions.

In accordance with yet another solution shown in FIG. 2, a separate non-buffered path (34, 36, 38, 40, 42) is provided for each peripheral to signal the interrupt request to a special interrupt input register 44 in the host processor 28. This approach requires the provision of a separate path outside the bus structure for each such peripheral used for data communication and therefore requires special purpose hardware. This approach is also subject to a race condition because the interrupt can arrive before all data has cleared all intermediate buffers.

Accordingly, a need exists for a method and apparatus for reliable generation, transmission and reception of interrupt requests over buffered buses without the interrupt requests incurring significant delay due to buffering and without creating a race condition between the interrupt requests and corresponding data.

SUMMARY OF THE INVENTION

A method and apparatus for reliable interrupt reception over a buffered bus utilizes a non-delayed non-posted write transaction to write data over the bus from a peripheral device to host memory. Because there is no buffering delay in a non-delayed non-posted write transaction, at the completion of the write cycle the peripheral knows that the write transaction is complete and then sends an interrupt request to the host processor requesting the host processor to service the interrupt and process the contents of the host memory.

BRIEF DESCTIPTION OF THE DRAWINGS

DETAILED DESCRIPTION OF THE PREFERRED EMBODIMENTS

Figure 1:
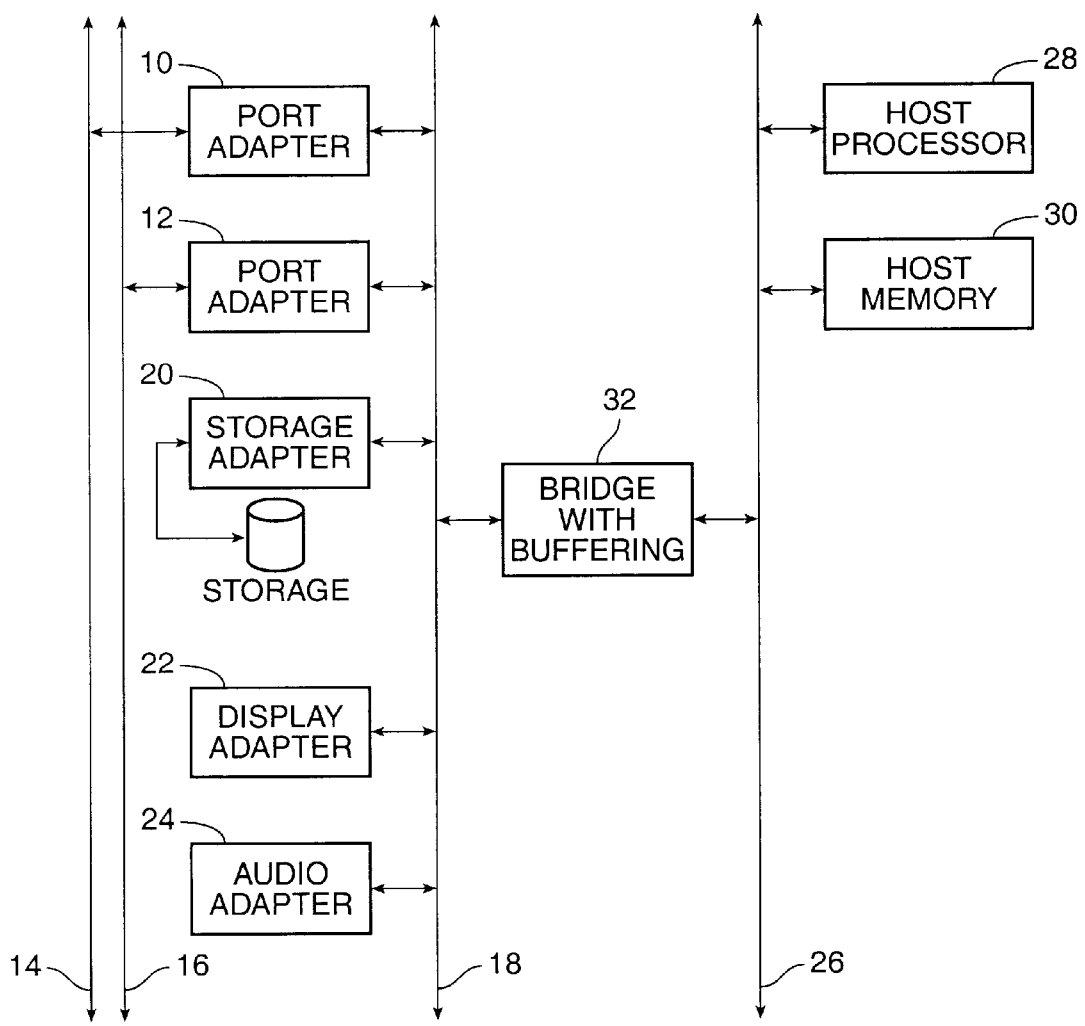
FIG. 1 is a system block diagram of a system having a buffered transaction bus.
Figure 2:
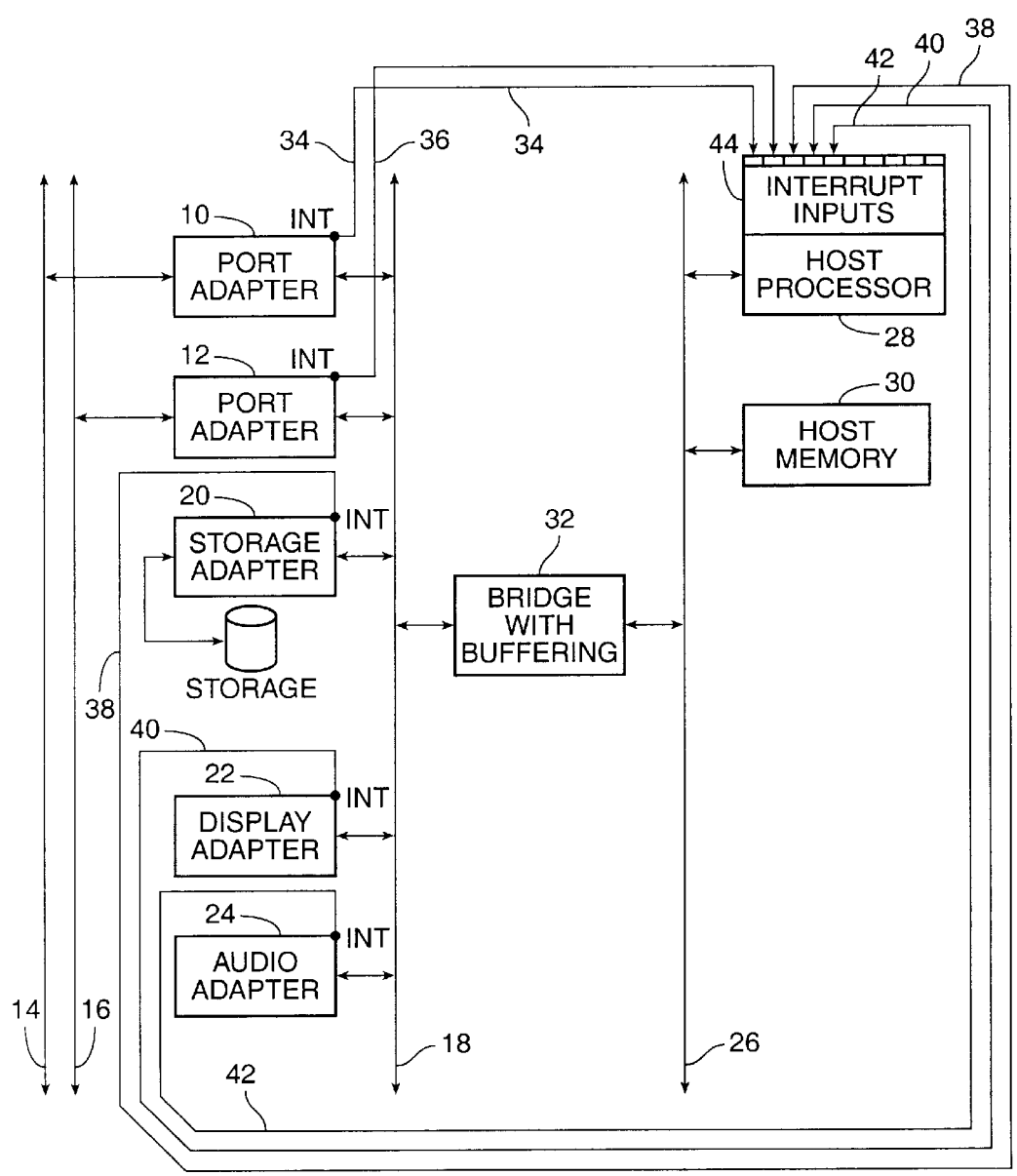
FIG. 2 is a system block diagram of a system having a buffered transaction bus and hardwired interrupt structure.

Those of ordinary skill in the art will realize that the following description of the present invention is illustrative only and not intended to be in any way limiting. Other embodiments of the invention will readily suggest themselves to such skilled persons after a perusal of the within disclosure.

In accordance with the present invention a method and apparatus is presented which overcome limitations of the prior art. Reliable interrupt reception by a host processor properly synchronized with receipt of data in host memory is accomplished by utilizing a non-delayed non-posted write transaction to write data from an initiating peripheral device over a buffered bus to host memory. Because there is no buffering delay at the completion of a non-delayed non-posted write transaction, at the completion of the write cycle the initiating peripheral device will know that the write transaction is actually complete, rather than potentially pending in some buffer, and can then reliably send an interrupt request by any convenient means to the host processor requesting that the host processor service the interrupt and process the data pending in host memory.

While a presently preferred embodiment of the present invention employs a PCI (peripheral component interchange) architecture to implement the buffered bus, other architectures supporting buffered buses are also within the scope of this invention. Similarly, while a presently preferred embodiment of the present invention receives packets from port adapters interfaced to data communications network segments, transmits them to host memory, has a host processor process the packets in accordance with various protocols, and retransmits the packets from port adapters, other forms of data and types of processing are also within the scope of this invention.

Certain assumptions may be made regarding the operation of buffered busses. First, posted write transactions must complete on the target bus segment in the order in which they are received from the initiator bus segment. Second, delayed write transactions do not pass previously posted write transactions. Third, delayed read transactions "push" previously posted write transactions—that is to say that the posted write transactions must complete on the target bus segment before the delayed read request can be attempted on the target bus segment. Fourth, delayed read transactions for data traveling in the same direction must push previously posted write data. That is to say that when the initiator of the read transaction is on the same side of the bridge as the target of the write transaction, the posted write transaction must complete to the target before the read data is returned to the initiator. Fifth, write transactions flowing in one direction have no ordering requirements with respect to write transactions flowing in the other direction—thus the bridge can accept posted write transactions on both interfaces at the same time, and the bridge can initiate posted write transactions on both interfaces at the same time. Sixth, the bridge accepts posted write transactions, regardless of the state of completion of any delayed transaction (read or write) being forwarded across the bridge.

Figure 3:
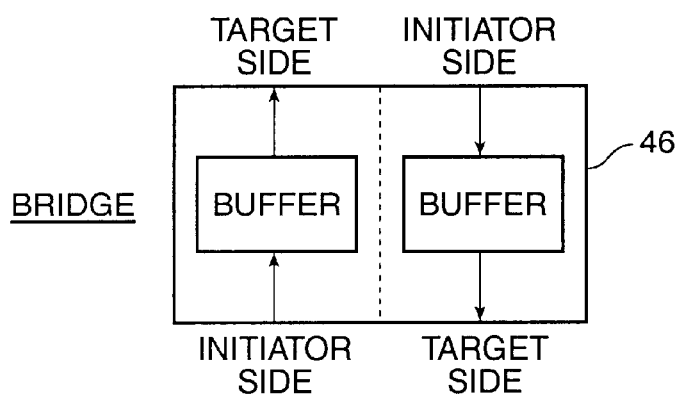
FIG. 3 is a block diagram of a buffered bridge device.
Figure 4:
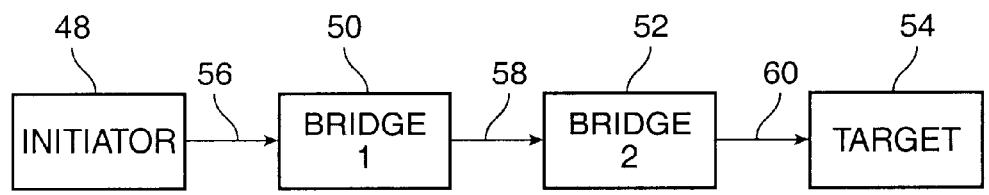
FIG. 4 is a block diagram of a buffered bus.

A posted write transaction is diagrammed in FIG. 3. In a posted write transaction, an "initiator" (say, for example, a peripheral device) communicates with a preferably two-way buffering bridge device 46 which may be a PCI bridge device. The initiator has a data write transaction to perform across bridge 46. This is diagrammed in FIG. 4, for example, where an initiator 48 must send data across bridge 1 (50) and bridge 2 (52) to be received at target 54. To get the data from initiator 48 to target 54 initiator 48 performs a posted write transaction to bridge 1 (50). When the bus segment 56 is available the data goes into a buffer in bridge 1 (50). Bridge 1 (50) thereupon attempts a posted write to bridge 2 (52). When the bus segment 58 is available the data moves to the buffer in bridge 2 (52). Finally bridge 2 (52) attempts a write into target 54. When the bus segment 60 is available, it will complete the write transaction. Other devices may contend for the use of these bus segments and conventional bus arbitration schemes are used to resolve which device will obtain access at any given instant. Posted write transactions introduce latency and synchronization problems.

A delayed write transaction differs from a posted write transaction. In a delayed write transaction the initiator 48 waits until it has acquired access to bus segments 56, 58 and 60. It may have to wait a while for this. Then, when all segments are available, a non-buffered write transaction is passed directly from initiator 48 to target 54 without significant buffering delays at bridges 1 (50) and 2 (52).

In a non-delayed non-posted write transaction in accordance with a presently preferred embodiment of the present invention, the initiator 48 sends data comprising one or more blocks across one or more bridges to a target 54. All but the last block of data are sent using normal posted write transactions. The last block of data is sent from initiator 48 to target 54 using a delayed write transaction to obtain all relevant bus segments, e.g., segments 56, 58 and 60. In this way, at the completion of the delayed write transaction, because all bus segments were available and allocated to the transaction, the initiator knows that the final block of data has arrived at the target, that all intermediate buffers have been cleared out (a condition to availability of all bus segments 56, 58, 60) and that it is now appropriate to send the interrupt request to host processor 28. The interrupt request may be sent in any manner over the bus using a delayed write transaction (not necessary), over a separate interrupt line (not necessary) and the like. The invention makes it possible, however, to send the interrupt request over the conventional bus in a conventional manner without making additional special arrangements to ensure synchronization. No extra processor cycles are required to implement the present invention.

Figure 5:
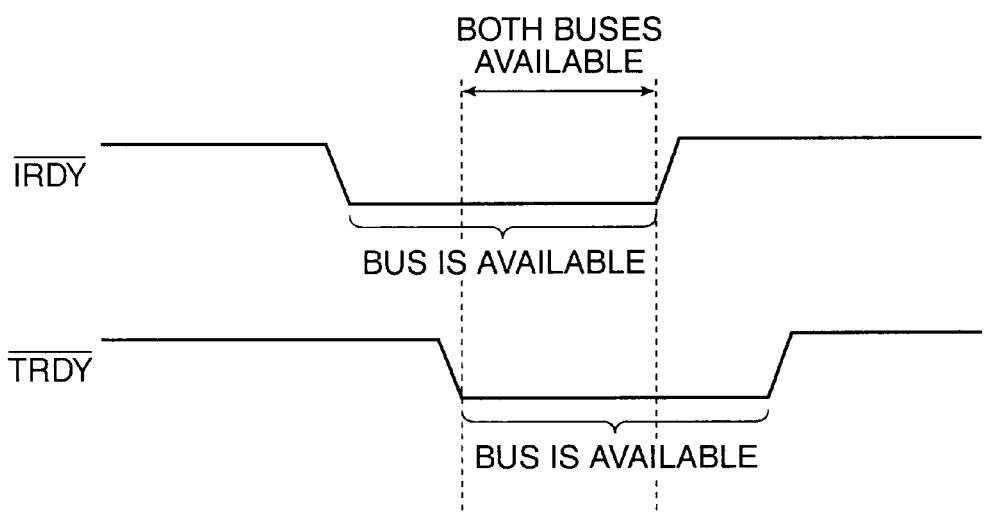
FIG. 5 is a timing diagram of some signals generated by the bridge device.

FIG. 5 shows the timing of signals IRDY (initiator ready, active low) and TRDY (target ready, active low) which are generated by a bridge such as bridge 46. When IRDY is low, the initiator side bus segment is available. When TRDY is low, the target side bus segment is available. When they are both low, both busses are available and a delayed write transaction is possible.

Figure 6:
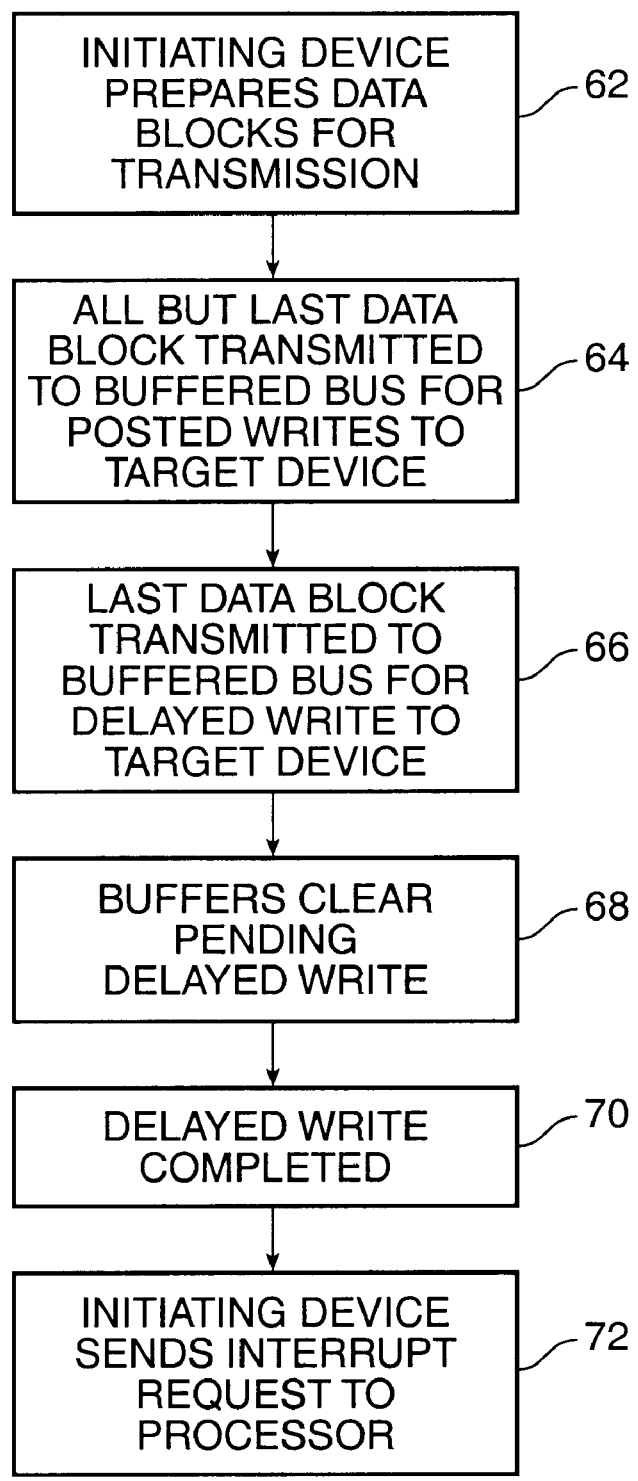
FIG. 6 is a flow chart of a method for writing data to a target device from an initiating device in accordance with a presently preferred embodiment of the present invention.

FIG. 6 is a flow diagram showing operation of the invention. At reference numeral 62 the initiating device prepares the data for transmission. In most cases there will be a plurality of data blocks for transmission in accordance with any data write transaction.

At reference numeral 64 all but the last data block are transmitted over the buffered bus to the target (memory) using posted write transactions.

At reference numeral 66 the last data block is transmitted over the buffered bus to the target (memory) using a delayed write transaction which allows all buffers to clear (reference numeral 68) so that both the initiating segments and target segments of the buffered bus may be made simultaneously available for a non-buffered transmission of the last data block from the initiator to the target.

At the completion of the delayed write (reference numeral 70) the initiating device signals an interrupt request to the processor associated with the target (memory).

Alternatively, the data may all be sent using posted writes and the interrupt request may be sent using a delayed write, achieving the same effect.

Alternative Embodiments

While embodiments and applications of the invention have been shown and described, it would be apparent to those of ordinary skill in the art, after a perusal of the within disclosure, that many more modifications than mentioned above are possible without departing from the inventive concepts herein. The invention, therefore, is not to be restricted except in the spirit of the appended claims.

What is claimed is:

1. A method for writing data from an initiating device to target device over a buffered bus, comprising:
   dividing the data into a plurality of data blocks;
   sending all but the last data block over the buffered bus using a posted write transaction; and
   sending the last data block over the buffered bus using a delayed write transaction.

2. A method in accordance with claim 1, further comprising:
   sending an interrupt request to a processor in communication with the initiating device after completion of the delayed write transaction.

3. A method in accordance with claim 2 wherein said interrupt request is sent over the buffered bus.

4. A method in accordance with claim 3 wherein said interrupt request is sent using a posted write transaction.

5. A method in accordance with claim 3 wherein said interrupt request is sent using a delayed write transaction.

6. A method for writing data from an initiating device to a target device in communication with a processor, said data written over a buffered bus, said method comprising:
   sending the data over the buffered bus using a posted write transaction; and
   sending an interrupt request to the processor over the buffered bus using a delayed write transaction after completing the sending of the data.

7. An apparatus for writing data from an initiating device to a target device, comprising:
   a data divider associated with the initiating device, said data divider dividing the data into a plurality of data blocks;
   a buffered bus in communication with the data divider and the target device; and
   a bridge disposed in the buffered bus, said bridge supporting delayed write and posted write transactions for transmitting data from an initiating side to a target side of said bridge.

8. An apparatus in accordance with claim 7 wherein said initiating device sends an interrupt request to a processor in communication with the target device after completion of the delayed write transaction.

9. An apparatus in accordance with claim 8 wherein the interrupt request is sent over said buffered bus.

10. An apparatus in accordance with claim 9 wherein the interrupt request is sent using a posted write transaction.

11. An apparatus in accordance with claim 9 wherein the interrupt is sent using a delayed write transaction.

12. An apparatus for writing data from an initiating device to target device, comprising:
   a buffered bus in communication with the initiating device, said buffered bus receiving a multi-data-block communication from the initiating device; and;
   a bridge disposed in the buffered bus, said bridge supporting delayed write and posted write transactions.

13. An apparatus in accordance with claim 12 wherein the data includes a plurality of data blocks and said bridge uses a posted write transaction to transmit all data blocks except a last data block and said bridge uses a delayed write transaction to transmit the last data block.

14. An apparatus in accordance with claim 13 wherein the initiating device transmits and interrupt request to a processor in communication with the target device after completion of the delayed write transaction.

15. An apparatus in accordance with claim 14 wherein the interrupt request is sent over said buffered bus.

16. An apparatus in accordance with claim 15 wherein the interrupt request is sent using a posted write transaction.

17. An apparatus in accordance with claim 15 wherein the interrupt request is sent using a delayed write transaction.

18. An apparatus in accordance with claim 12 wherein the data is transmitted across said bridge using a posted write transaction and the initiating device transmits an interrupt request to a processor in communication with the target device across said bridge using a delayed write transaction at the completion of the posted write transaction.

* * * * *

UNITED STATES PATENT AND TRADEMARK OFFICE
CERTIFICATE OF CORRECTION

PATENT NO. : 6,209,054 B1  
DATED : March 27, 2001  
INVENTOR(S) : Glenn E. Lee

It is certified that error appears in the above-identified patent and that said Letters Patent is hereby corrected as shown below:

<u>Column 2,</u>
Line 18, replace "ore" with -- more --.

<u>Column 6,</u>
Line 40, replace "and" with -- an --.

Signed and Sealed this

Twenty-sixth Day of February, 2002

Attest:

*Attesting Officer*

JAMES E. ROGAN  
*Director of the United States Patent and Trademark Office*